United States Patent [19]

Yamada et al.

[11] Patent Number: 5,154,768
[45] Date of Patent: Oct. 13, 1992

[54] SOLAR HEAT-SHIELDING PAINT COMPOSITION AND COATED STRUCTURE HAVING THE PAINT LAYER

[75] Inventors: Naofusa Yamada; Hironobu Kawasaki; Hatsuo Inagaki; Kazumasa Kobayashi, all of Chiba, Japan

[73] Assignee: Nippon Steel Chemical Co., Ltd., Tokyo, Japan

[21] Appl. No.: 826,208

[22] Filed: Jan. 22, 1992

Related U.S. Application Data

[63] Continuation of Ser. No. 382,794, Sep. 1, 1989, abandoned.

[30] Foreign Application Priority Data

Nov. 6, 1987 [JP] Japan .................. 62-279061
Nov. 12, 1987 [JP] Japan .................. 62-284234

[51] Int. Cl.⁵ .............................................. C08K 3/22
[52] U.S. Cl. ..................................... 106/450; 106/426; 106/438; 501/904; 501/905
[58] Field of Search ............. 501/904, 905; 106/426, 106/438, 450

[56] References Cited

U.S. PATENT DOCUMENTS

| | | | |
|---|---|---|---|
| 2,068,294 | 2/1932 | Korinth et al. | 106/426 |
| 2,304,947 | 12/1939 | Monk et al. | 106/426 |
| 3,576,656 | 4/1971 | Zerlaut et al. | 106/426 |
| 4,168,986 | 9/1979 | Venis, Jr. | 106/450 |
| 4,272,291 | 6/1981 | Shtern | 106/14.05 |
| 4,375,989 | 3/1983 | Mäkinen | 106/438 |
| 4,711,916 | 12/1987 | Hagiwara et al. | 106/450 |
| 4,741,778 | 5/1988 | Horie et al. | 106/287.18 |
| 4,744,831 | 5/1988 | Beck | 106/450 |
| 4,874,433 | 10/1989 | Kiss et al. | 106/450 |
| 4,894,092 | 1/1990 | Nishihara et al. | 106/450 |
| 4,948,530 | 8/1990 | Barthelmes et al. | 106/450 |

FOREIGN PATENT DOCUMENTS

| | | |
|---|---|---|
| 55-27272 | 2/1980 | Japan . |
| 55-71548 | 5/1980 | Japan . |
| 55-74862 | 6/1980 | Japan . |
| 55-33828 | 9/1980 | Japan . |
| 55-120669 | 9/1980 | Japan . |
| 56-109257 | 8/1981 | Japan . |
| 60-86173 | 5/1985 | Japan . |

OTHER PUBLICATIONS

Patent Abstract of Japan, vol. 4, No. 182 (C-25) [664], 16th Dec. 1980; & JP-A-55 120 669 (Jkirou Takei) Sep. 17, 1980.
Patent Abstract of Japan, vol. 9, No. 222 (C-302) [1945] Sep. 9, 1985; & JP-A-60 86 173 (Kikusui Kagaku Kogyo K.K.) May 15, 1985.
Chemical Abstract, vol. 90, No. 2, Jan. 1979, p. 73, Abstract No. 7704z, Columbus, Ohio, US; & JP-A-78 96 039 (Takei Jiro) Aug. 22, 1978.
Derwent Abstract, 80-50936c; Takei, Jirou; JP-5-5-074862, Jun. 5, 1980.
Chemical Abstracts, CA 93(4):27872c, "Heat Shielding Decorative Metal Board", JP-55-27272, Feb. 27, 1980.

Primary Examiner—Karl Group
Assistant Examiner—Scott L. Hertzog
Attorney, Agent, or Firm—Nikaido, Marmelstein, Murray & Oram

[57] ABSTRACT

The solar heat-shielding paint composition of the present invention contains a solar heat-shielding pigment having a grain size of 50 μm or less in a proportion of from 2 to 60% by weight of the solid content of the composition as a part or all of the pigment. The solar heat-shielding paint-coated structure having an outermost overcoat layer made of the said paint composition on the structure base displays an excellent solar heat-shielding effect and has a long-time durability with no problem of environmental pollution. The overcoat may be colored in any desired color to give a beautiful outward appearance. The coated structure is extremely useful as an outdoor structure, for example, marine structures such as decks or tanks of ships, as well as land structures such as architectures of petroleum tanks, houses, buildings, storehouses or gymnasia, and cars, tank lorries and refrigerator containers.

17 Claims, 1 Drawing Sheet

SOLAR HEAT-SHIELDING PAINT COMPOSITION AND COATED STRUCTURE HAVING THE PAINT LAYER

This application is a continuation division of application Ser. No. 382,794 filed Sep. 1, 1989, abandoned.

TECHNICAL FIELD

The present invention relates to a solar heating-shielding paint composition and a coated structure having the paint layer and, more precisely, to a solar heat-shielding paint composition which is applicable to the outer surface of outdoor structures such as marine structures, for example, decks and tanks to be used in tankers and other ships, as well as land structures, for example, cylindrical or spherical tanks for petroleum and others, architectures of houses, buildings, storehouses or gymnasia, and cars, tank lorries, regrigerator containers and the like, thereby to prevent elevation of the internal temperature by direct sun light and to elevate the air-cooling or freezing effect for attaining economization of energy and which is suitable for prevention of vapourization of petroleum or other volatile components, and to a solar heat-shielding paint-coated structure having a paint layer made of such paint composition.

BACKGROUND ART

Hitherto, economization of air-conditioning expenses by preventing elevation of the internal temperature in the inside of structures by direct sun light, inhibition of vapourization and reduction of volatile components in the inside of tankers, natural gas-conveying ships and land tanks by coating the outer surfaces of such structures, and improvement of the freezing effect of tanks and household electric appliances have been strongly desired. For instance, reduction of crude oils because of vapourization of the volatile contents from tankers is noticeable, and it is said that the vapourization loss is to be from 0.2 to 0.5 % of the total loadage per one shipping from the Middle and Near East to Japan.

In order to overcome the problem, a white pigment such as titanium oxide, or a colored pigment, has hitherto been used as a solar heat-shielding paint composition. While the solar heat-shielding effect is somewhat effective in the case of a white pigment, the solar heat-shielding effect is extremely lowered in the case of a colored, but not white, pigment. Accordingly, development of a paint composition which may have a high solar heat-shielding effect even when colored in any desired color has been requested.

On the other hand, an aluminium paint composition containing a flaky aluminium powder is also already been known as a solar heat-shielding paint composition for roofs of structures or outer surfaces of tanks. However, the color of such aluminium paint composition is also limited and the composition is insufficient in the point of the durability. In addition, the abrasion resistance of the resulting paint is poor and therefore the composition has another problem that it is unsuitable to the place where persons will walk thereon.

Under the circumstances, a heat-reflecting enamel containing antimony trioxide, antimony dichromate or an alkali metal dichromate has been proposed for the purpose of overcoming the problems (Japanese Patent Application Laid-Open No. 56-109257), which is, however, unfavorable from the viewpoint of environmental sanitation as it contains a heavy metal. In addition, a sufficient effect could not be attained by such enamel coating.

An emulsion-coating composition containing fine glass beads having a grain size of from 20 to 350 μm, a coating composition containing white pigment-containing synthetic silica grains having a grain size of 300 μm or less, and a method of forming a metal plate coated with a coating composition containing fine glass beads having a grain size of from 5 to 300 μm have also be proposed (Japanese Patent Publication No. 55-33828, Japanese Patent Application Laid-Open No. 55-120669, Japanese Patent Application Laid-Open No. 55-74862). However, though these have an excellent solar heat-shielding effect, the coated surface has a rough pattern and has a poor pollution-resistance and the solar heat-shielding effect of the coated surface becomes problematically because it becomes extremely lower, with the lapse of time. By such means, therefore, it is difficult to obtain a coating composition or a coated structure which can be colored in any desired color and which may maintain an excellent solar heat-shielding effect for a long period of time.

Combined use of an organic material such as $CoCr_2O_7$, $K_2SO_4$, $SiN_4$, $K_2SO_3$, $SiO_2$, $Al_2SiO_5$ or the like or an organic material such as vinyl fluoride/vinylidene fluorice copolymer, polyoxypropylene, polypropylene, difluoride copolymer, vinylidene difluoride, polyethylene chloride trifluoride, polyethylene tetrafluoride or the like and rutile titanium oxide has also been proposed (Japanese Patent Application Laid-Open No. 60-86173). However, the inorgnaic materials of $CoCr_2O_7$, K and $K_2SO_3$ have a poor durability and the said organic materials could hardly maintain a sufficient solar heat-shielding effect for a long period of time. The reason why these organic materials have a poor durability is because they have a poor adhesiveness to vehicles. In addition, the said inorganic materials do not have a sufficient solar heat-shielding effect.

Under the situation, the present inventors repeatedly and earnestly studied so as to overcome the above-mentioned problems and, as a result, have found that a paint composition containing a solar heat-shielding pigment, which has a high solar heat radiation reflectivity in the ultraviolet range, and in the near infrared range and which has a grain size of 50 um or less, in a proportion of from 2 to 60% by weight of the solid content has an excellent long-time durability and may additionally be colored in any desired color with no environmetal sanitary problem, and thus have achieved the present invention.

Accordingly, one object of the present invention is to provide a solar heat-shielding paint composition, which coats the outer surface of outdoor structures which are exposed to direct sunlight, such as various land or marine structures, ships, buildings, household electric appliances and the like thereby to prevent elevation of the internal temperature of the thus coated structures and to display an extreme effect for economization of energy, for example, by reducing the air-conditioning costs, and additionally to lower reduction and vapourization of the content in petroleum tanks or the like.

Another object of the present invention is to provide a solar heat-shielding paint composition which has an excellent long-time durability with no environmental sanitary problem and which can be colored in any desired color to give a beautiful outward appearance.

Still another object of the present invention is to provide a solar heat-shielding paint-coated structure for outdoor use which has an outermost overcoat layer at least made of the said solar heat-shielding paint composition, the said overcoat paint having the function of preventing elevation of the internal temperature in the inside of the thus coated structure thereby to display an excellent effect for economization of energy, for example, by reducing the air-conditioning costs and for prevention of reduction and vapourization of the content in petroleum tanks or the like.

A further object of the present invention is which are provide a solar heat-shielding paint-coated structure which has an outermost overcoat layer at least made of the said solar heat-shielding paint composition and which has an excellent long-time durability with no environmental sanitary problem and can be colored in any desired color to give a beautiful outward appearance.

A still further object of the present invention is to provide a solar heat-shielding paint-coated structure which has an outermost overcoat layer made of the said solar heat-shielding paint composition and additionally has a substrate layer with excellent heat-insulating property, adhesion strength and corrosion-resistance and which has an excellent solar heat-shielding effect, when used under the condition of direct sunlight exposure, and additionally has an excellent long-time durability with no environmental sanitary problem and can be colored in any desired color to give a beautiful outward appearance.

DISCLOSURE OF INVENTION

Specifically, the present invention provides a solar heat-shielding paint composition consisting essentially of a vehicle and a pigment, which is characterized by its containing a solar heat-shielding pigment having a grain size of 50 um or less in a proportion of from 2 to 60 % by weight of the solid content and provides a solar heat-shielding paint-coated structure which has a paint layer at least made of the said solar heat-shielding paint composition as the outermost layer of the structure base.

In the solar heat-shielding paint composition of the present invention, the solid content of the paint composition means the substances therein which neither evaporate nor vapourize even under heat and, in general, it indicates the components which will form the film coat. For instance, it includes pigments, resin contents in the vehicle and other additives.

The solar heat-shielding pigment for use in the paint composition of the present invention is desirably one having a reflectivity of 90 % or more in the ranges of 380 nm or less and 780 and or more than the visible ray ranges and having a reflectivity of 85 % or more, preferably 87 % or more, in the all ranges of from 350 nm to 2100 nm, for the sunlight radiation reflectivity to be calculated from the spectral reflectivity (R$\lambda$i) as defined for the heat ray-shielding or glass scattering-preventing films for structures in JIS A 5759. In addition, the pigment is further desired to be such that is safe for environmental sanitation, excellent in water-proofness and weather-resistance and can maintain its excellent heat-shielding effect for a long period of time.

As substances having such properties, there are mentioned, for example, zirconium oxide, yttrium oxide or indium oxide or a mixture of two or more of them; substances formed by coating the surface of various pigment bases with an orgnaic or inorganic film of 0.01 $\mu$m or more, preferably from 0.01 to 1 $\mu$m; as well as compounds composed of one or more components selected from titanium oxide, zirconium oxide, indium oxide and silicon oxide and one or more components selected from calcium oxide, magnesium oxide, yttrium oxide, barium oxide and zinc oxide. Any one of them, or a mixture of two or more of them, is preferably employed in the present invention.

Regarding the substances formed by coating the surface of a pigment base with an inorgnaic film of 0.01 $\mu$m or more among the said pigments, a film made of the above-mentioned zirconium oxide, yttrium oxide or indium oxide or a mixture of two or more of them may be used as the inorganic film, whereby the same solar heat-shieldability and weather-resistance as the case using the said metal oxides themselves as the solar heat-shielding pigment can be attained irrespective of the kind of the pigment base used. In this case, the pigment base to be coated is not specifically limited as mentioned above, but includes, for example, a flaky pigment powder such as mica powder or aluminium powder as well as a metal oxide such as titanium oxide, magnesium oxide, barium oxide, calcium oxide or zinc oxide.

Where magnesium oxide, barium oxide, calcium oxide and/or zinc oxide are/is used among the said substances, these have an insufficient water-proofness though they have an excellent initial heat-shielding effect by themselves. Therefore, if they are used as a solar heat-shielding pigment as they are, they would be subjected to chemical variation because of the fact that water adsorbed in the coated paint over a long-time use of the coated structure will finally cause discoloration and deterioration of the heat-shielding effect of the coating. Accordingly, it is preferred that such substances are themselves coated with an organic or inorganic film of a thickness of 0.01 $\mu$m or more, preferably from 0.01 to 1 $\mu$m, which is optically relatively transparent and which has excellent water-proofness, whereby the intrinsic heat-shielding effect can effectively be activated and the paint coat may display the excellent heat-shielding function. The organic or inorganic film to be used for this purpose is not specifically limited provided that it is optically relatively transparent as mentioned above. For example, the organic film is preferably made of silicone resin, melamine resin or urethane resin, and the inorganic film of silica or titania.

The above-mentioned various solar heat-shielding pigments can be employed singly or, if desired, in the form of a mixture of two or more of them.

The said solar heat-shielding pigment grains have a grain size of 50 $\mu$m or less, preferably 20 $\mu$m or less, from the view point of pollution resistance. If the grain size of the pigment grains is more than 50 $\mu$m, the film to be formed from the pigment-containing paint composition would have fine projections and depressions on the surface thereof and, in particular, dusts or smuts would adhere to the depressions so that the surface of the paint film would become stained to thereby lower the solar heat-shielding effect.

Regarding the pigment of the solar heat-shielding pigment in the composition of the present invention, it is necessary that the said content is from 2 to 60 % by weight of the solid content of the paint composition. If the paint contains the said pigment. If the content of the pigment is less than 2 % by weight pigment, the intended sufficient solar heat-shielding effect could not be attained. However, if it is more than 60 % by weight, the pigment content in the resulting paint film would be too much and the chalk resistance would become poor. As a result, there would be a problem in that the coating would than be lacking in weather-resistance.

In addition, the solar heat-shielding paint composition of the present invention may contain any other pigments in addition to the said solar heat-shielding pigment. The additional pigments which may be employed for the purpose are not specifically limited, but include, for example, white pigments, such as rutile titanium oxide, as well as conventional colored pigments which have heretofore been generally used in this technical field, such as manganese dioxide or carbon black.

The vehicle to constitute the solar heat-shielding paint composition of the present invention is preferably one that has excellent yellowing-resistance, color retentiveness, gloss retentiveness, chalk resistance and other durability, and one which will maintain the heat-shielding effect for a long period of time. Such vehicles include those which may be dried at room temperature and others which are suitable to forced drying. As examples of the former vehicle which may be dried at room temperature, there are mentioned composites consisting essentially of one or more of acrylic resins, silicone-modified polyester resins, alkyd resins, silicone-modified alkyd resins and fluorine-containing resins and optionally additionally containing one or more of hexamethylene diisocyanate or adducts thereof, isophorone diisocyanate or adducts thereof, hydrogenated xylylene diisocyanate or adducts thereof, hydrogenated dicyclohexylmethane diisocyanate or adducts thereof and tetramethylxylylene diisocyanate or adducts thereof, as well as composites consisting essentially of an acrylic resin having carboxyl group and/or amino group and optionally additionally containing a compound having glycidyl group. As examples of the latter vehicle which is suitable to forced drying, there are mentioned composites consisting essentially of one or more of polyester resins, silicone-modified polyester resins, fluorine-containing resins and acrylic resins and optionally additionally containing one or more of blocked isocyanates and melamine resins.

The paint composition of the present invention thus composed of the above-mentioned components is dissolved or dispersed in an orgnaic solvent and adjusted to have a viscosity pertinent for coating, in actual use of the composition. The orgnaic solvent to be used for the purpose may be selected from various orgnaic solvents of hydrocarbons, alcohols, ether alcohols, ethers, esters, ester alcohols and ketones, the selection of which is made in consideration of the coatability and dryability.

The solar heat-shielding paint composition of the present invention may optionally contain a surface smoothing agent, an ultraviolet absorbent, a viscosity adjusting agent, a hardening catalyst, a pigment dispersing agent, a pigment precipitation inhibitor and a color separation inhibitor, if desired.

The thus prepared solar heat-shielding paint composition is then coated on a structure base to provide at least the outermost overcoat on the said structure base, and accordingly, a solar heat-shielding paint-coated structure is thereby created.

The structure base for constituting the solar heat-shielding paint-coated structure may be any one which is an outdoor structure and which is exposed to direct sunshine and which can be coated with a paint composition. For instance, there are mentioned, as already described hereinbefore, marine structures, for example, decks and tanks to be used in tankers and other ships, as well as land structures, for example, cylindrical or spherical tanks for petroleum and others, architectures of houses, buildings, storehouses or gymnasia, and cars, tank lorries, refrigerator containers and the like.

The film thickness of the overcoat layer made of the instant solar heat-shielding paint composition, which constitutes the outermost layer on the structure base is generally 1 $\mu$m or more, preferably 10 $\mu$m or more. If the thickness is less than 1 $\mu$m, the influence of the structure base or the substrate layer to be formed under the said paint layer would be so strong that the solar heat-shielding effect and other effects of the solar heat-shielding paint coating could not be sufficiently displayed in some cases. The upper limit of the film thickness of the said layer is not specifically limited and the effect may be attained even when the thickness is fairly large. However, as the effect would not be increased if the thickness is made larger than the necessary range, the film thickness is suitably from 10 to 100 $\mu$m or so.

In the solar heat-shielding paint-coated structure of the present invention, it is preferred to provide a substrate layer, which has excellent heat-insulating property, adhesion strength and/or corrosion-resistance, between the outermost overcoat layer made of the solar heat-shielding paint composition of the invention and the structure base, whereby the solar heat-insulating effect by the solar heat-shielding paint overcoat layer may be enhanced and the adhesion of the overcoat layer to the structure base is augmented and additionally the corrosion-resistant effect of the overcoat paint may more effectively be attained.

Accordingly, the substrate layer to be provided for the purpose is preferably such as one which consists essentially of a filler, having an excellent heat-insulating property, and a vehicle, having excellent adhesiveness and corrosion-resistance. As such filler having an excellent heat-insulating property, which is to be contained in the substrate layer, flaky substances and/or spherical hollow substances are preferred. As the vehicle, there are mentioned epoxy resins, epoxy-modifeid resins, phenol-modified butyral resins, acrylic resins, silicone-modified polyester resins, alkyd resins, fluorine-containing resins and urethane resins. Only one of them may be used, or a mixture of two or more of them may also be used.

As the flaky substances to be emplyable as the filler for the said subbing layer, for example, there are mentioned flaky metals such as glass flakes, mica, as well as stainless steel flakes and aluminium foil flakes. Preferred are glass flakes and mica, in view of their low thermal conductivity. The size of the flaky substances may be 50 $\mu$m or less, preferably 20 $\mu$m or less. If the size of the flaky substances is more than 50 $\mu$m, the surface of the substrate layer as formed would be rough to have projections or depressions thereon, which would have some bad influences on the solar heat-shielding paint coat layer to be formed thereover. As a result, the solar heat-shielding paint coat layer would also have the corresponding projections and depressions to thereby lower the pollution-resistance and lower the solar heat-shielding effect. Additionally, the heat-insulating effect and the corrosion-resisting effect would also lower. In particular, where the size of the flaky substances is 20 um or less, the flakes would be positioned almost in parallel to the coated surface if the proportion of the said flaky substances to the vehicle is selected to fall within a pertinent range and, as a result, a fine layer could be formed and the water-permeable pathway is prolonged. Accordingly, a so-called labyrinth effect is thereby attained and therefore the corrosion-resistance is improved and the heat-insulating effect is also improved.

As the spherical hollow substances to be employable as the filler for the said substrate layer, for example, there are mentioned glass balloons, siliceous balloons as well as resin balloons, such as polystyrene balloons, and the size thereof is preferably from 1 to 50 μm. If the size of the spherical hollow substances is more than 50 μm, there would be the same problem as the case of the said flaky substances, but if it is less than 1 μm, the hollow effect, or that is, the heat-insulating effect would be lower.

In the said substrate coat layer, the content of the said filler is preferably within the range of from 2 to 60 % by weight of the coat, and the content of the vehicle is preferably within the range of from 20 to 60 % by weight of the coat. If the content of the filler is less than 2 % by weight, the heat-insulating effect could not be attained, but if it is more than 60 % by weight, the adhesiveness of the substrate coat layer would lower and therefore the substrate coat layer would have a bad influence on the upper solar heat-insulating paint layer. If the content of the vehicle in the substrate layer is less than 20 % by weight, the adhesiveness of the coat layer would be insufficient, but if it is more than 60 % by weight, the heat-insulating effect and the corrosion-resisting effect would lower.

In the solar heat-shielding paint-coated structure of the present invention, the substrate layer to be provided between the solar heat-shielding paint layer and the structure base may be only one layer or it may also be composed of two or more layers. In addition, a primer layer may further be provided between the said substrate layer and the structure base so that the said substrate layer may adhere more firmly to the surface of the structure base.

BEST MODES OF CARRYING OUT THE INVENTION

Figure 1:
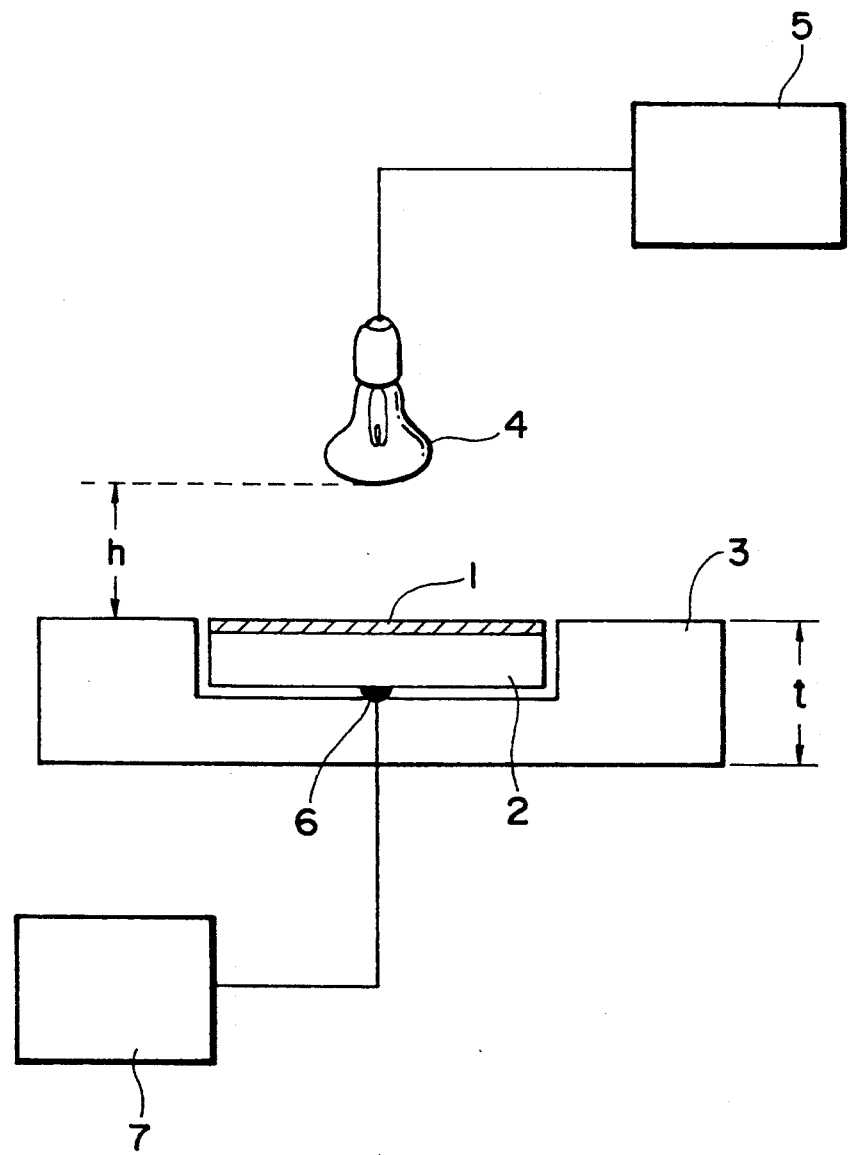
FIG. 1 is an explanatory view to show a test device for measuring the temperature of the back surface of test pieces obtained in examples and comparative examples to follow, so as to determine the solar heat-shielding effect of the said test pieces.

Now, the present invention will be explained concretely on the basis of examples and comparative examples to follow hereunder.

EXAMPLES 1 TO 9 AND COMPARATIVE EXAMPLES 1 TO 8

(1) Preparation of Constitutive Components

Solar Heat-Shielding Pigments (A) Zirconium oxide having a mean grain size of 4.2 μm was prepared, which is Pigment (A). The substance had a reflectivity of 94 % in the other range than the visible ray range and had a sunlight radiation reflectivity of 93 % in the total range.

(B) Titanium oxide having a mean grain size of 1 μm was coated with zirconium butoxide to prepare titanium oxide coated with zirconium oxide film having a thickness of 0.05 μm, which is Pigment (B). The substance had a reflectivity of 92 % in the other range than the visible ray range and had a sunlight radiation reflectivity of 93 % in the total range.

(C) A mixture formed by blending titanium oxide and magnesium oxide in a molar ratio of 1/1 was fired at 1600° C., and the resulting compound was pulverized into a powder having a mean grain size of 12 μm. The thus obtained substance is Pigment (C). The substance had a reflectivity of 91 % in the other range than the visible ray range and had a sunlight radiation reflectivity of 86 % in the total range.

(D) A mica powder having a mean grain size of 10 μm was coated with zirconium butoxide to prepare mica coated with zirconium oxide film having a thickness of 0.01 μm, which is Pigment (D). The substance had a reflectivity of 92 % in the other range than the visible ray range and had a sunlight radiation reflectivity of 89 % in the total range.

(E) Magnesium oxide having a mean grain size of 2.2 μm was dipped in an aqueous 10 % solution of indium chloride and then evaporated to dryness and fired at 800° C. to form an indium oxide film having a film thickness of 0.05 μm thereon. The thus obtained substance is Pigment (E). The substance had a reflectivity of 93 % in the other range than the visible ray range and had a sunlight irradiation reflectivity of 92 % in the total range.

Colored Pigments

Titanium oxide (CR-95, trade name by Ishihara Sangyo KK) was used as a white pigment. The substance had a reflectivity of 95 % in the range other than the visible ray range and had a sunlight radiation reflectivity of 91 % in the total range.

(2) Preparation of Paint Composition (1) Acryl polyol (Acrydick A-801, trade name of Dai-Nippon Ink & Chemical Co.) was used as the vehicle. This was blended with the above-mentioned solar heat-shielding pigments and colored pigments together with silica powder ($SiO_2$ powder, 300 mesh) and aluminium silicate ($Al_2O_3 \cdot 2SiO_2 \cdot 2H_2O$) in the proportions as indicated in Table 1 , and carbon black (Carbn MA-100, trade name by Mi Kasei Corp.) was added thereto so that the ting blend could give a specific hue. This was then dispersed in a mixed solvent of xylene and methyl isobuyyl ketone (1/1) for 20 minutes and adjusted to a viscosity of from 20 to 30 ps. Just before coating, hexamethylene diisocyanate adduct (Takenate D-170N, trade name of Takeda Chemical Industries Co.) was added to the composition in a molar ratio (NCO/OH) of 1/1. Accordingly, paint composition No. 1 to No. 6, No. 10 to No. 12, No. 16 and No. 17 were prepared.

(2) Acryl polyol (Acrydick A-910, trade name of Dai-Nippon Ink & Chemical Co.) was used as a vehicle. This was blended with the above-mentioned solar heat-shielding pigment and colored pigment in the proportions as indicated in Table 1 below, and carbon black (Carbon MA-100, trade name of Mitsubishi Kasei Corp.) was added thereto so that the resulting blend could give a specific hue. This was then dispersed in a mixed solvent of toluene and methyl isobutyl ketone (1/1) for 20 minutes and adjusted to a viscosity of form 20 to 30 ps. Just before coating, sorbitol polyglycidyl ether (Decanol EX-612, trade name of Nagase Kasei Kogyo KK) was added to the composition in a molar ratio ((—COOH+—N(R)$_2$/epoxy group) of 1/1. Accordingly, paint composition No. 7 was prepared.

(3) A mixture comprising 70 parts of polyester resin (Bailon 56CS, trade name of Toyo Spinning Co.) and 30 parts of melamine resin (saimeru 327, trade name by Mitsui Toatsu Chemicals Co) was used as a vehicle. This was blended with solar heat-shielding pigments and colored pigments in the proportions as indicated in Table 1 below, and carbon black (Carbon MA-100, trade name of Mitsubishi Kasei Corp.) was added thereto so that the resulting blend could give a specific hue. This was then dispersed in a mixed solvent of cyclohexanone and petroleum solvent for 30 minutes and adjusted to a viscosity of from 10 to 20 ps. Accordingly, paint composition No. 8, No. 9, No. 14 and No. 15 were prepared.

(4) A mixture comprising 70 parts of chloride rubber (CR-20, trade name of Asahi Denka Kogyo KK) and 30 parts of paraffin chloride (Empara 40, trade namy of Ajinomoto Co.) was used as a vehicle. This was blended with a colored pigment in the proportions as indicated in Table 1, and carbon black (Carbpn MA-100, trade name by Mitsubishi Kasei Corp.) was added thereto so that the resulting blend could give a specific hue. This was then dispersed in a mixed solvent of xylene and petroleum solvent for 30 minutes and adjusted to a viscosity of from 10 to 20 ps. Accordingly, paint composition No. 13 was prepared.

(3) Preparation of Test Pieces and Test Tanks

Test Pieces

The above-prepared paint composition Nos. 1 to 7, Nos. 10 to 13 and Nos. 16 and 17 were used. One of them was coated on a soft steel plate having a size of 150 mm×70 mm×1 mm by spray-coating to form a film having a dry thickness of 50 μm. After being dried at 20° C. for 2 weeks, the test pieces were prepared.

On the other hand, the paint compositions Nos. 8 and 9 and Nos. 14 and 15 were also used, and one of them was coated on a zinc-plated steel plate having a thickness of 0.6 mm with a bar coater to form a film thereon having a dry thickness of 20 μm. After being dried under heat at 230° C for 60 seconds, test pieces were prepared.

Test Tanks

An epoxy resin primer was coated on a 10-liter steel tank in a film thickness of 20 μm, and then one of the paint compositions Nos. 1 to 7, Nos. 10 to 13 and Nos. 16 and 17 was coated thereover by spray-coating to form an overcoat film thereon having a dry thickness of 50 μm. After being dried and hardened at room temperature for 2 weeks, test tanks were prepared.

(4) Test Methods

For testing the said test pieces, the test device as shown in FIG. 1 was used, where an incandescent lamp was irradiated onto the solar heat-shielding paint-coated surface side of the test piece and the temperature of the back side surface of the test piece was measured. Accordingly, the solar heat-shielding effect of the paint composition as coated on the test piece was checked.

The test device of FIG. 1 will be explained in more detail. A steel plate (2) (test piece) having a coated layer (1) was inlaid into a styrol foam (3) having a thickness of t=30, with the coated layer (1) facing upwards. An incandescent lamp (4) (500 W Photoreflector Lamp) was set over the coated layer (1) at a distance of h=370 mm, and this was connected with the electric source (5). On the other hand, the back side surface side of the steel plate (2) was equipped with a temperature sensor (6), which was connected to a temperatrue recorder (7). After thus being arranged, the room temperature was adjusted to 20°±1° C. and the voltage of the electric source (5) was controlled to 70±1 V. Under this condition, an incandescent lamp (4) was turned on and the temperature in the position of the temperature sensor (6) was recorbed with a temperature recorder (7).

In addition, an opening mouth was formed in each of the test tanks prepared as mentioned above and the respective test tanks were filled with 1,1,2-trichloroethane. The tanks were allowed to stand outdoors under direct sunshine condition for 7 days, and the degree of the reduction of the content (1,1,2-trichloroethane) was measured.

The test results are shown in Table 1 below.

TABLE 1

| | | | Proportion of Solid Content (wt. %) | | | | | | | | | | Test Results | | | |
| | | | | | | | | | | | | | Initial Test Results | | Test Results after One-year Exposure | |
| | No. of Paint Composition | Vehicle | Solar Heat Shielding Pigment | | | | | Titanium Oxide | Silica Powder | Al Silicate (*) | Hue (N) | Temperature of Back Surface (°C.) | Reduction of Content in Tank (wt. %) | Temperature of Back Surface (°C.) | Reduction of content in Tank (wt. %) |
| | | | A | B | C | D | E | | | | | | | | |
| Example 1 | 1 | 50 | 5 | — | — | — | — | 45 | — | — | 9.5 | 44 | 1.4 | 46 | 2.0 |
| Example 2 | 2 | " | 5 | — | — | — | — | 45 | — | — | 8 | 54 | 3.8 | 55 | 4.3 |
| Example 3 | 3 | " | 5 | — | — | — | — | 45 | — | — | 6 | 63 | 5.7 | 63 | 6.4 |
| Example 4 | 4 | " | — | 25 | — | — | — | 25 | — | — | 9.5 | 42 | 1.1 | 44 | 1.8 |
| Example 5 | 5 | " | — | — | 20 | — | — | 30 | — | — | 8 | 52 | 3.8 | 52 | 4.1 |
| Example 6 | 6 | " | — | — | — | 15 | 15 | 20 | — | — | 8 | 51 | 3.5 | 52 | 3.9 |
| Example 7 | 7 | " | — | — | — | — | 20 | 30 | — | — | 8 | 51 | 3.4 | 52 | 4.1 |
| Example 8 | 8 | " | — | — | — | 10 | — | 40 | — | — | 9.5 | 43 | — | 45 | — |
| Example 9 | 9 | " | — | — | — | 10 | — | 40 | — | — | 8 | 55 | — | 56 | — |
| Comparative Example 1 | 10 | " | — | — | — | — | — | 50 | — | — | 9.5 | 47 | 2.4 | 51 | 2.8 |
| Comparative Example 2 | 11 | " | — | — | — | — | — | " | — | — | 8 | 62 | 5.5 | 63 | 6.2 |
| Comparative Example 3 | 12 | " | — | — | — | — | — | " | — | — | 6 | 75 | 10.2 | 78 | 11.3 |
| Comparative Example 4 | 13 | " | — | — | — | — | — | " | — | — | 9.5 | 49 | 3.1 | 61 | 5.5 |
| Comparative Example 5 | 14 | " | — | — | — | — | — | " | — | — | 9.5 | 48 | — | 54 | — |
| Comparative | 15 | " | — | — | — | — | — | " | — | — | 8 | 66 | — | 68 | — |

TABLE 1-continued

| | No. of Paint Composition | Vehicle | Proportion of Solid Content (wt. %) | | | | | | | | | Test Results | | | |
|---|---|---|---|---|---|---|---|---|---|---|---|---|---|---|---|
| | | | Solar Heat Shielding Pigment | | | | | Titanium Oxide | Silica Powder | Al Silicate (*) | Hue (N) | Initial Test Results | | Test Results after One-year Exposure | |
| | | | A | B | C | D | E | | | | | Temperature of Back Surface (°C.) | Reduction of Content in Tank (wt. %) | Temperature of Back Surface (°C.) | Reduction of content in Tank (wt. %) |
| Example 6 Comparative Example 7 | 16 | " | — | — | — | — | — | 40 | 10 | — | 8 | 58 | 4.8 | 59 | 5.1 |
| Comparative Example 8 | 17 | " | — | — | — | — | — | 40 | — | 10 | 8 | 60 | 5.1 | 62 | 6.0 |

(Note)
(*) Aluminium Silicate

EXAMPLES 10 TO 15 AND COMPARATIVE EXAMPLES 9 TO 13

(1) Preparation of Constitutive Components

Solar Heat-shielding Pigments (F) Yttrium oxide, having a mean grain size of 3 μm, was prepared, which is Pigment (F).

(G) Mica, having a mean grain size of 10 μm was surface-treated with an ethanol solution of zirconium tetrabutoxide to form a zirconium oxide film, having a film thickness of 0.1 μm, thereon. This is Pigment (G).

(H) Indium oxide having a mean grain size of 2.5 μm, was surface-treated with an ethanol solution of titanium tetrabutoxide to form a titanium oxide (titania) film, having a film thickness of 0.1 μm, thereon. This is Pigment (H).

(I) Magnesium oxide, having a mean grian size of 2 μm, was surface-treated with a silicone resin to form a silicone resin film, having a film thickness of 0.1 μm, thereon. This is Pigment (I).

(J) A mixture comprising titanium oxide and magnesium oxide (1/1 by mol) was fired at 1900° C, and the resulting compound was pulverized to a mean grain size of 5 μm. This is Pigment (J).

(K) A mixture comprising zinc oxide and zirconium oxide (1/1 by mol) was fired at 1400° C, and the resulting compound was pulverized to a mean grain size of 4 μm to obtain a zinc oxide/zirconium oxide compound powder. On the other hand, yttrium oxide, having a mean grain size of 3 μm, was surface-treated with an ethanol solution of zirconium tetrabutoxide to prepare a zirconium oxide-coated yttrium oxide powder, the thickness of the zirconium oxide film being 0.1 μm. The thus prepared two powders were blended in a weight ratio of 1/1. The resulting blend is Pigment (K).

(L) Magnesium oxide, having a mean grain size of 2 μm, was prepared, which is Pigment (L). (Fillers in Substrate Layer)

(M) Mica powder having a mean grain size of from 5 to 10 μm was prepared, which is Filler (M).

(N) Glass balloons, having a mean grain size of 3 um, were prepared, which are Filler (N).

(O) Siliceous balloons having a mean grain size of 3 μm were prepared, which are Filler (O).

(2) Preparation of Paint Compositions

The above-mentioned pigments (F) to (G), vehicle resins (UP: urethane resin, SP: silicone resin, PE: polyester resin, AP: acrylic resin, FP: fluorine resin) and titanium oxide, as white pigment, were blended so that the coated and dried film (outermost overcoat) have the compositions as indicated in Table 2 below. Carbon black was added thereto so that the film could give the specified hue of from N 9.5 to N 6. A solvent was added to the blend to give the indicated paint composition.

For preparing the substrate layer-coating composition, the above-mentioned fillers (M) to (0), vehicle resins and titanium oxide were blended so that the coated and dried film (substrate layer) have the compositions as indicated in Table 2 below. A solvent was added to the blend to give the indicated substrate layer-coating composition.

(3) Preparation of Test Pieces and Test Tanks

Test Pieces

In the same manner as the above-mentioned Examples 1 to 9, an epoxy resin primer was coated on a soft steel plate to form a primer coat having a thickness of 20 μm. Next, the substrate layer-coating composition was coated thereover to form a substrate layer having a dry thickness of 150 μm, and finally the overcoat-coating paint composition was overcoated to form an outermost overcoat having a dry film thickness of 50 μm. Accordingly, test pieces were prepared.

Test Tanks

An epoxy resin primer was coated on a 10-liter steel tank to form a primer coat having a dry thickness of 20 μm, and the above-mentioned substrate layer-coating composition and overcoat-coating paint composition were coated in order over the primer layer. The dry film thickness of the substrate layer was 150μm, and that of the outermost overcoat paint layer was 50 μm. After being dried and hardened, test tanks were prepared.

(4) Test Methods

In the same manner as the above-mentioned Examples 1 to 9, the test pieces and the test tanks prepared above were tested for evaluating the solar heat-shielding effect and for measuring the reduction of the contents (1,1,2-trichloroethane) in the tank. The results are shown in Table 2 below.

TABLE 2

| | Overcoat Layer (50 μm) | | | | | | Subbing Layer (150 μm) | | | | Initial Test Results | | Test Results after One-year Exposure | |
| | Solar Heat Shielding Pigment | | Vehicle | | Titanium Oxide | Hue (N) | Filler | | Vehicle | | Titanium Oxide | Temperature of Back Surface (°C.) | Reduction of Content in Tank (wt. %) | Temperature of Back Surface (°C.) | Reduction of Content in Tank (wt. %) |
| | Kind | Proportion | Kind | Proportion | | | Kind | Proportion | Kind | Proportion | | | | | |
|---|---|---|---|---|---|---|---|---|---|---|---|---|---|---|---|
| Example 10 | F | 40 | UP | 50 | 10 | 9.5 | M | 40 | UP | 40 | 20 | 42 | 1.2 | 44 | 1.8 |
| Example 11 | G | " | SP | " | " | 8 | N | 20 | SP | 50 | 30 | 54 | 3.8 | 55 | 4.1 |
| Example 12 | H | " | SPPE | " | " | 9.5 | M | 40 | SPPE | 40 | 20 | 43 | 1.3 | 46 | 1.9 |
| Example 13 | I | 30 | AP | " | 20 | " | O | 20 | AP | 50 | 30 | 42 | 1.2 | 44 | 1.8 |
| Example 14 | J | 40 | UP | " | 10 | 6 | M | 30 | UP | " | 20 | 62 | 5.7 | 63 | 6.4 |
| Example 15 | K | 50 | FP | " | — | 9.5 | " | 30 | FP | " | " | 42 | 1.2 | 42 | 1.2 |
| Comparative Example 9 | — | — | UP | " | 50 | " | " | 40 | UP | 40 | " | 48 | 2.5 | 50 | 2.8 |
| Comparative Example 10 | F | 40 | " | " | 10 | " | — | — | " | 50 | 50 | 44 | 1.4 | 47 | 2.1 |
| Comparative Example 11 | — | — | SP | " | 50 | 8 | N | 20 | SP | " | 30 | 62 | 5.5 | 64 | 6.3 |
| Comparative Example 12 | L | 30 | AP | " | 20 | 9.5 | O | 20 | AP | " | " | 42 | 1.2 | 52 | 4.1 |
| Comparative Example 13 | — | — | UP | " | 50 | 6 | M | 30 | UP | " | 20 | 75 | 10.2 | 78 | 11.3 |

In Table 2, Example 10 where Pigment (F) was used in the outermost layer and Comparative Example 9 where the outermost layer contained no solar heat-shielding pigment are compared with each other. Although the other components were the same in the two samples, there are noted differences between them in the temperature of the back surface of 6° C. and in the reduction of the tank contents of 1.0 to 1.3 %. Examples 10 and Comparative Example 10 are compared with each other, where the outermost paint layer was same but the incorporation of the filler into the substrate layer was different. There are noted differences between them in the temperature of the back surface of 2° to 3° C. and in the reduction of the tank content of 0.2 to 0.3 %. Example 11 and Comparative Example 11 were compared with each other, where the hue (N 8) was same and the substrate layer was same but the former contained Pigment (B) and the latter contained no solar heat-shielding pigment. There are also noted differences between them in the temperature of the back surface of 8° to 9° C. and in the reduction of the tank contents of 1.7 to 1.8 %. Example 12 contained Pigment (H) and showed the same, effect as Example 10. Example 13 and Comparative Example 11 were compared with each other, where the former contained Pigment (I) but the latter contained non-treated magnesium oxide (L). Although the initial test results (for temperature of the back surface and reduction of the tank content) are same, there were noted differences between them in the test results after one-year exposure, or specifically in the temperature of the back surface of 8° C. and in the reduction of the tank contents of 2.3 %. (This is considered to be because of the deterioration of the magnesium oxide in the presence of the water which was absorbed into the coated paint film after exposures to thereby worsen and fatigue the paint film.) Example 14 and Comparative Example 13 are compared with each other, where the both had the same hue (N 6) and the same substrate layer but one contained Pigment (J) and the other contained no solar heat-shielding pigment. There are noted differences between them in the temperature of the back surface of 13° to 15° C. and in the reduction of the, tank contents of 4.5 to 4.9 %. Example 15 contained Pigment (K) and a containing fluorine resin as a vehicle. It is noted that the samples of Example 15 were not deteriorated even after exposure and still had excellent characteristics.

As is obvious from the results in the above-mentioned examples and comparative examples, the solar heat-shielding paint compositions and the paint-coated structures of the present invention have an extremely excellent solar heat-shielding effect. When compared in the samples having the same color but no heat shielding pigment, the elevation of the temperature of the back surface in the test pieces and the reduction of the contents of the test tanks could noticeably be prevented in the case of the test samples of the present invention. Accordingly, the paint compositions of the present invention are effectively applied to the outer surface of ships and various structures which are to be exposed to direct sunlight, whereby the thus coated outer surface may be shielded from the solar heat for a long period of time so that the elevation of the inner temperature may be prevented, the air-conditioning costs may be reduced and the reduction of the contents in the thus coated container by vapourization may be prevented or reduced. Accordingly, the present invention displays an extreme effect for economization of energy.

INDUSTRIAL APPLICABILITY

In accordance with the present invention, a solar heat-shielding paint composition is coated over the surface of a structure base to form an outermost overcoat layer thereon. Accordingly, a structure having an outermost overcoat layer at least containing a solar heat-shielding paint composition may be prepared by the present invention. The thus coated structure has an excellent solar heat-shielding effect when used outdoors. In addition, the structure has a sufficient long-time durability with no problem regarding environmental pollution, and the overcoat of the structure may be colored in any desired color to give a beautiful outward appearance. The coated structures of the present invention are useful as outdoor structures, for example, marine structures such as decks or tanks of ships, as well as land structures such as architectures of petroleum tanks, houses, buildings, storehouses or gymnasia, and cars, tank lorries and refrigerator containers.

We claim:

1. A solar heat shielding coating composition consisting essentially of a vehicle and a pigment comprising 2 to 60 weight percent, based on the total solids content of said composition, of solar heat shielding pigment particles, of a grain size of up to about 50 μm, of at least one member selected from the group consisting of zirconium oxide, yttrium oxide and indium oxide;

wherein said coating composition, after having been coated on a surface and exposed to direct sunlight, has a sunlight reflectivity of at least 85% in all wavelengths from 350 nm to 2100 nm.

2. A coating composition as claimed in claim 1 wherein said pigment particles are coated with a film having a thickness of at least 0.01 μm.

3. The solar heat-shielding paint composition as claimed in claim 1, in which the vehicle consists essentially of one selected from acrylic resins, silicone-modified polyester resins, alkyd resins, silicone-modified alkyd resins and fluorine-containing resins or a mixture of two or more of them and optionally additionally contains one selected from hexamethylene diisocyanate or adducts thereof, isophorone diisocyanate or adducts thereof, hydrogenated xylylene diisocyanate or adducts thereof, hydrogenated dicyclohexylmethane diisocyanate or adducts thereof and tetramethylxylylene diisocyanate or adducts thereof or a mixture of two or more of them.

4. The solar heat-shielding paint composition as claimed in claim 1, in which the vehicle consists essentially of an acrylic resin having carboxyl group and/or amino group and optionally additionally contains a compound having glycidyl group.

5. The solar heat-shielding paint composition as claimed in claim 1, in which the vehicle consists essentially of one selected from polyester resins, silicone-modified polyester resins, fluorine-containing resins and acrylic resins or a mixture of two or more of them and optionally additionally contains a block isocyanate and/or a melamine resin.

6. A paint composition, suited to be applied to a structure which is at least partially exposed to direct sunlight, as a solar heat shielding protective layer, which comprises the composition claimed in claim 1 and a carrier therefore.

7. A paint composition as claimed in claim 6 wherein said vehicle and said pigment are dispersed in said carrier.

8. A paint composition as claimed in claim 6 wherein said pigment particles are coated with a film having a thickness of at least 0.01 μm.

9. A structure, which is at least partially exposed to direct sunlight, having the solar heat shielding composition claimed in claim 1 coated on at least some of the surface thereof which is exposed to direct sunlight.

10. A structure as claimed in claim 9 wherein said solar heat shielding particles are contained in an outermost overcoat layer on said structure.

11. The solar heat-shielding paint-coated structure as claimed in claim 9, which has a substrate layer consisting essentially of a heat-insulating filler and an adhesive and corrosion-resisting vehicle.

12. The solar heat-shielding paint-coated structure as claimed in claim 9, in which the solar heat-shielding pigment contained in the outermost overcoat layer is a substance coated with an inorganic film having a thickness of 0.01 μm or more.

13. The solar heat-shielding paint-coated structure as claimed in claim 9, in which the solar heat-shielding pigment contained in the outermost overcoat layer is coated with a film having a thickness of from 0.01 to 0.1 μm and composed of a silicone resin, a melamine resin or an urethane resin or silica or titania.

14. The solar heat-shielding paint-coated structure as claimed in claim 9 in which the solar heat-shielding pigment contained in the outermost overcoat layer is one selected from magnesium oxide, barium oxide, zinc oxide and calcium oxide or a mixture of two or more of them the surface of which has been coated with a film having a thickness of from 0.01 to 0.1 μm and composed of a silicone resin, a melamine resin or an urethane resin or silica or titania.

15. The solar heat-shielding paint-coated structure as claimed in claim 9, in which the vehicle contained in the outermost overcoat layer consists essentially of one selected from acrylic resins, silicone-modified polyester resins, alkyd resins, silicone-modified alkyd resins, fluorine-containing resins and urethane resins or a mixture of two or more of them.

16. The solar heat-shielding paint-coated structure as claimed in claim 11, in which the filler contained in the substrate layer is a flaky substance and/or a spherical hollow substance.

17. The solar heat-shielding paint-coated structure as claimed in claim 11, in which the vehicle contained in the subbing layer consists essentially of one selected from epoxy resins, epoxy-modified resins, phenol-modified butyral resins, acrylic resins, silicone-modified polyester resins, silicone-modified alkyd resins, fluorine-containing resins and urethane resins or a mixture of two or more of them.

* * * * *